United States Patent [19]
Henriksen

[11] Patent Number: 5,900,154
[45] Date of Patent: May 4, 1999

[54] METHOD AND EQUIPMENT FOR THE PURIFICATION OF A LIQUID

[75] Inventor: Norolf Henriksen, Notodden, Norway

[73] Assignee: Mastrans AS, Notodden, Norway

[21] Appl. No.: 08/817,803

[22] PCT Filed: Oct. 6, 1995

[86] PCT No.: PCT/NO95/00181

§ 371 Date: Jun. 18, 1997

§ 102(e) Date: Jun. 18, 1997

[87] PCT Pub. No.: WO96/12678

PCT Pub. Date: May 2, 1996

[30] Foreign Application Priority Data

Oct. 19, 1994 [NO] Norway ................................ 943956
Jan. 27, 1995 [NO] Norway ................................ 950333

[51] Int. Cl.⁶ .................. C02F 1/24; C02F 1/52; C02F 1/40; B01D 21/08
[52] U.S. Cl. .................. 210/703; 210/708; 210/712; 210/738; 210/199; 210/205; 210/221.2; 210/521; 210/802
[58] Field of Search .................... 210/703, 708, 210/712, 738, 199, 205, 221.2, 521, 522, 802

[56] References Cited

U.S. PATENT DOCUMENTS

| | | |
|---|---|---|
| 2,242,139 | 5/1941 | Munroe . |
| 4,277,347 | 7/1981 | Pielkenrood . |
| 4,344,845 | 8/1982 | Pielkenrood . |
| 4,572,786 | 2/1986 | Endo . |
| 4,710,290 | 12/1987 | Briltz . |
| 4,750,994 | 6/1988 | Schneider . |
| 5,120,435 | 6/1992 | Fink . |
| 5,156,745 | 10/1992 | Cairo . |
| 5,167,798 | 12/1992 | Yoon et al. . |
| 5,356,533 | 10/1994 | Nakagawa . |

FOREIGN PATENT DOCUMENTS

| | | |
|---|---|---|
| 3-174292 | 7/1991 | Japan . |
| 2072650 | 3/1980 | United Kingdom . |

Primary Examiner—Thomas M. Lithgow
Attorney, Agent, or Firm—Wenderoth, Lind & Ponack, L.L.P.

[57] ABSTRACT

Method and equipment for purification of a liquid, where the liquid is polluted by other liquids or solid material, e.g. removing oil from oil contamined water, comprising a flocculation device (2) and a flotation device (8). The method comprises adding one or more chemicals to the liquid in a flocculation device that comprises one or more pipe loops (2) with built-in agitators (3, 20, 21) providing turbulence and plug-type flow through the loop. Thereupon purified liquid and pollutants are separated in the flotation device or in a sedimentation device (8). The equipment according to the invention comprises a pipe loop (2), provided with built-in agitator(s) (3, 20, 21), connected to the flotation device (8).

25 Claims, 4 Drawing Sheets

METHOD AND EQUIPMENT FOR THE PURIFICATION OF A LIQUID

BACKGROUND OF THE INVENTION

This invention relates to a method and an equipment for the purification of a liquid, wherein the liquid may be polluted by other liquids or solid material, e. g. removing oil from water, comprising a flotation device.

Extracting oil and gas offshore results in large amounts of sea water containing oil. The major part of the oil may be separated from the sea water in separating containers or tanks, but this purification is not sufficient for rendering the sea water back to the sea. Today, authoritative regulations say that spill water from offshore oil- and gas installations shall not contain more than 40 ppm oil.

When removing oil and/or other pollutants from water there are commonly a plurality of methods using centrifuges, hydrocyclones and flotation devices.

Centrifuges are advanced machines giving a high degree of purification, but their specific capacity is low. The use of a purification installation of this type when extracting oil, comprises a plurality of machines connected in parallel. Such installations are very expensive and it is required to keep a large stock of spare parts. The maintenance routines are also quite comprehensive.

Another disadvantage is that installations of this type are rather energy consuming. A typical energy consumption is 1 kwh/m$^3$ of purified water.

The hydrocyclone may be considered as "common art" because they are preferred in new platform installations. These cyclones have quite good performances at favourable working conditions. Meanwhile, they have some limitations and disadvantages. In the presence of small oil droplets, a chemical flocculation device has to be installed upstream the hydrocyclone installation. The shear forces that may occur in the hydrocyclones are large, and the flakes have to be very robust. Flakes with the required strength may be difficult to produce.

Further, the pressure drop in the hydrocyclone is large, commonly more than 40 m W.P.

Downstream from the hydrocyclone it is required to have a flotation chamber with a rather large capacity when relieving the pressure. According to certain working conditions a hydrocyclone plant may be quite comprehensive to install. The capacities of the hydrocyclones are small, and therefore they have to be connected in groups to serve as large batteries when higher capacity is demanded.

The third type of separating devices, flotation plants, are characterised in that they have low specific capacities and low purification effects. The space needed for this type of installation is large, and they are often difficult to operate. Today, flotation plants are regarded as "technology of the past", and are of little relevance in offshore use because of the disadvantages these plants represent.

SUMMARY OF THE INVENTION

The present invention may be regarded as a sort of flotation plant, but it represents a substantial improved solution among these. Thus, the plant according to the invention needs less space and volume, is substantially lighter and has better purification effects than hydrocyclone installations.

The invention is characterised in that the purification process comprises adding one or more chemicals to the polluted liquid contained in a flocculation device. The flocculation device consists of one or more pipe loop(s) with built-in agitator(s) that effect turbulence and plug-type flow through the loop, followed by separating the purified liquid and the pollutants in the flotation device or in a sedimentation device.

The equipment according to the present invention is characterised in that it comprises a pipe loop with built-in agitator in conjunction with the flotation device.

BRIEF DESCRIPTION OF THE DRAWINGS

In the following, the invention is described in detail with reference to drawings that illustrate embodiments thereof.

DETAILED DESCRIPTION OF THE INVENTION

Figure 1:
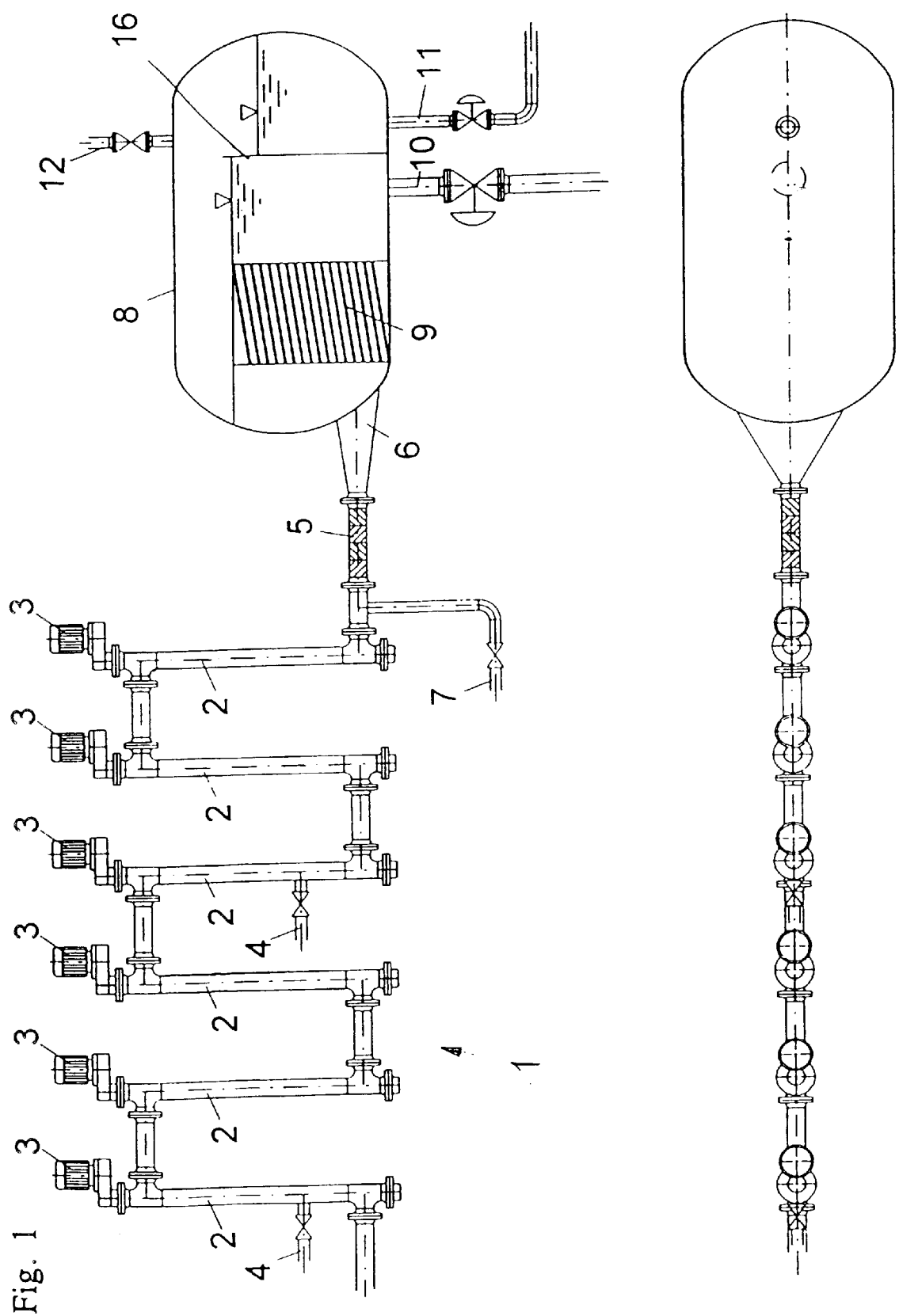
FIG. 1 is a schematic illustration of a liquid purification plant according to the invention.
Figure 2:
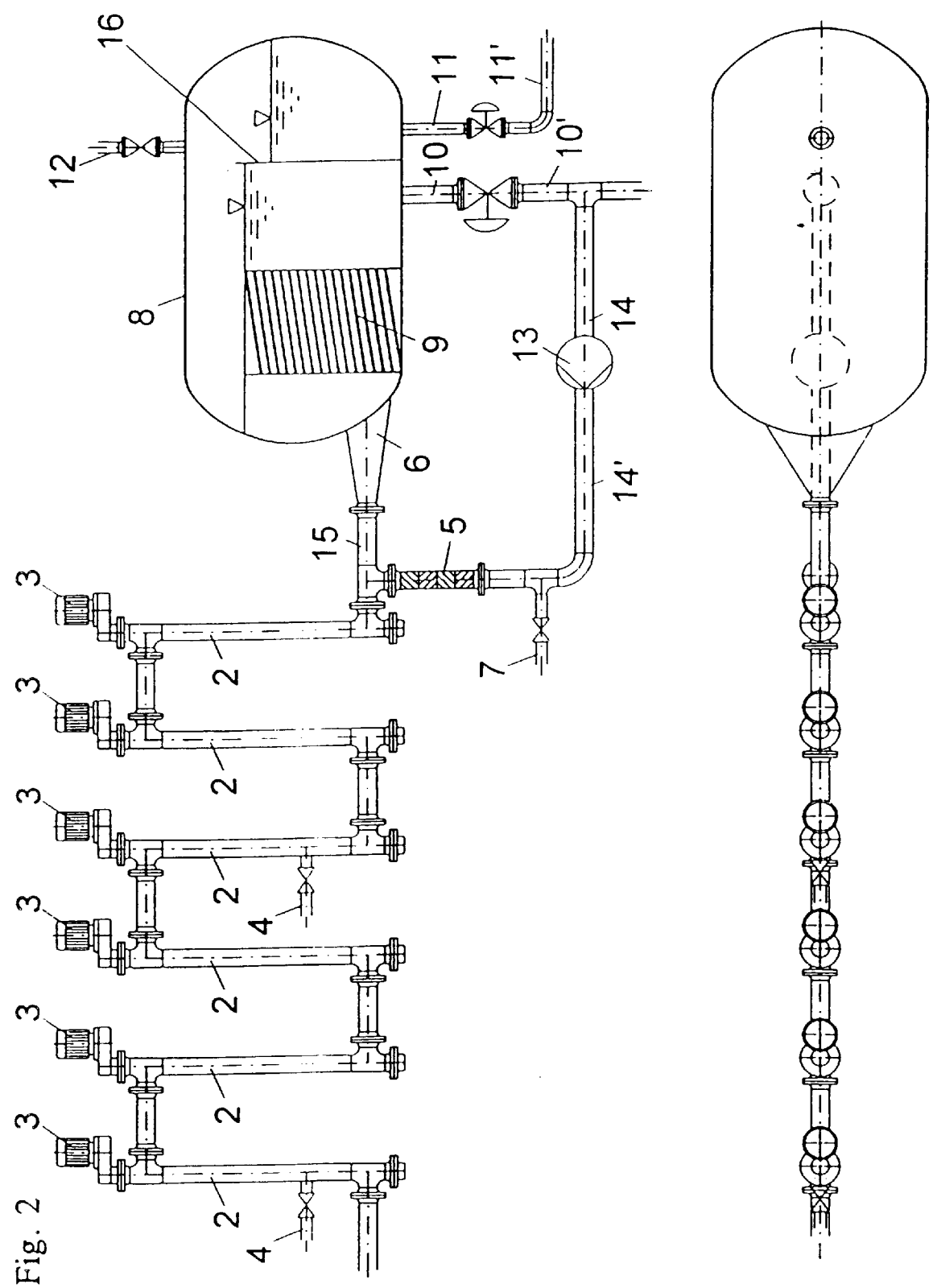
FIG. 2 is a schematic illustration of an alternative embodiment of the plant in FIG. 1.

As shown in FIGS. 1 and 2, the plant consist mainly of a pipe system or a pipe loop 1 comprising vertical pipe elements 2, a bubble generator for instance static mixers 5, and a flotation device or a sedimentation device 8.

The liquid to be treated is, as shown in FIG. 1, passed through the pipe elements 2 where the chemical flocculation takes place. The flocculation chemicals and flotation gas are supplied through the connecting line 4.

Figure 3:
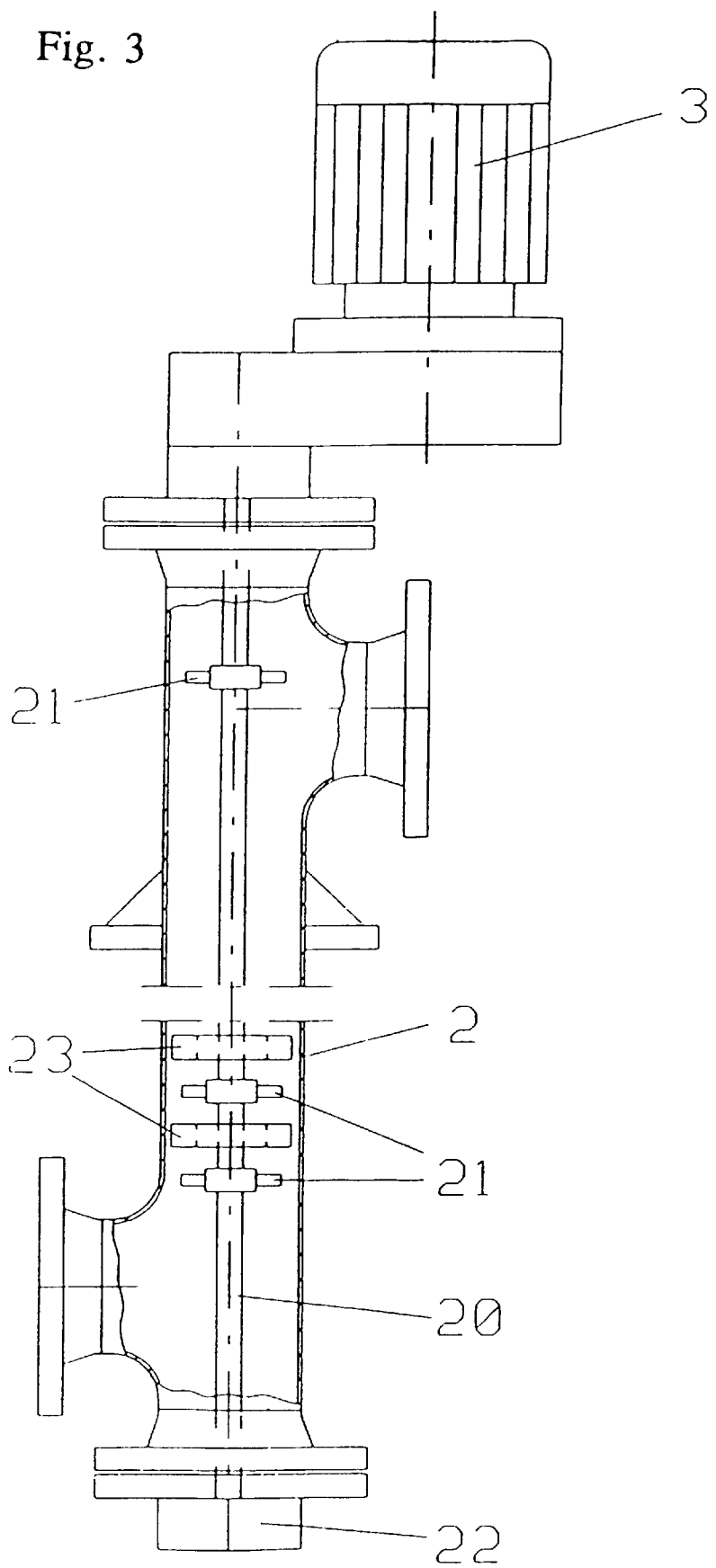
FIG. 3 is on an enlarged scale an agitator included in the invention shown in FIG. 1 and FIG. 2.

Each pipe element has a built-in agitator (FIG. 3) comprising a shaft 20 that goes through the element, the shaft being provided with propeller elements 21 and a support bearing 22. The agitator is driven by a motor 3 at an appropriate speed. The volume of the pipes is adapted to have sufficient time for obtaining flakes of sufficient size.

To diminish the rotation of the liquid in the pipe, the pipe is provided with stationary guiding vanes 23 between the propeller elements.

The propellers 21 and the guiding vanes 23 are so designed that desired turbulence is obtained, and such that the liquid moves in plug-type flow without the presence of too large shear forces.

Experiments in a pilot plant have shown that the purification effect when separating oil from water would be very satisfying, that is, less than 5 ppm when connecting the agitator directly to the flotation device formed as a flotation tank or -chamber.

However, in dependency of the type of pollutants that may be present, and in some cases, to further improve the purification process, it is required to supply air or another gas in an bubble generator as described above.

In the last embodiment, when the flakes are formed, FIGS. 1 and 2, air or gas is supplied through the pipe 1 and under the support of the bubble generator, e. g. as a set of static mixers, bubbles will be formed at desired size and quantity.

The gas required for flotation may alternatively, and preferably without any bubble generator applied, be supplied directly to the last flocculation pipe element. The liquid flow in this pipe element should be upward directed (not shown). By means of the built-in agitator and the guiding vanes, gas bubbles of suitable sizes are developed.

The static mixers 5 may be arranged in the connecting pipe between the flocculation pipe 2 and the diffusor 6, or in an outer circuit 14 as shown in FIG. 2.

The bubble and flake containing liquid passes through a diffusor 6 that results in a remarkable speed reduction of the liquid before it enters a flotation chamber 8.

A coalescer (bubble retriever) 9 is arranged in the floation chamber. The coalescer comprises tilted or horizontally arranged lamellas that cover the width of the flotation chamber. The lamellas are made of plates that may be plane or corrugated, arranged at a vertical distance of for instance 10–100 mm. The lamellas support formation of gas pockets at their underside.

Flakes that have retrieved gas bubbles pass with the liquid through the coalescer in a laminary flow, and will successively adhere to the lamellas.

In this manner, when the flakes have grown sufficiently large, they are forced out of the coalescer by the liquid flow, and rise rapidly to the surface of the flotation chamber. The flotation gas is ventilated by the pipe 12, the purified liquid is drained through pipe 10, and finally, separated flakes among some liquid is removed through pipe 11.

A partition wall 16 is arranged in the flotation chamber to define two separate chambers for respectively purified and skimmed liquid.

The length of the lamellas in the coalescer is so dimensioned that even the smallest flakes are retrieved. The distance between the outlet of the coalescer 9 and the partition wall 16 is adapted to give the flakes sufficient time to rise to the surface of the fluid.

Conventional methods may be implemented to control the amount of purified and skimmed liquid removed, although these methods will not be further described here.

Figure 4:
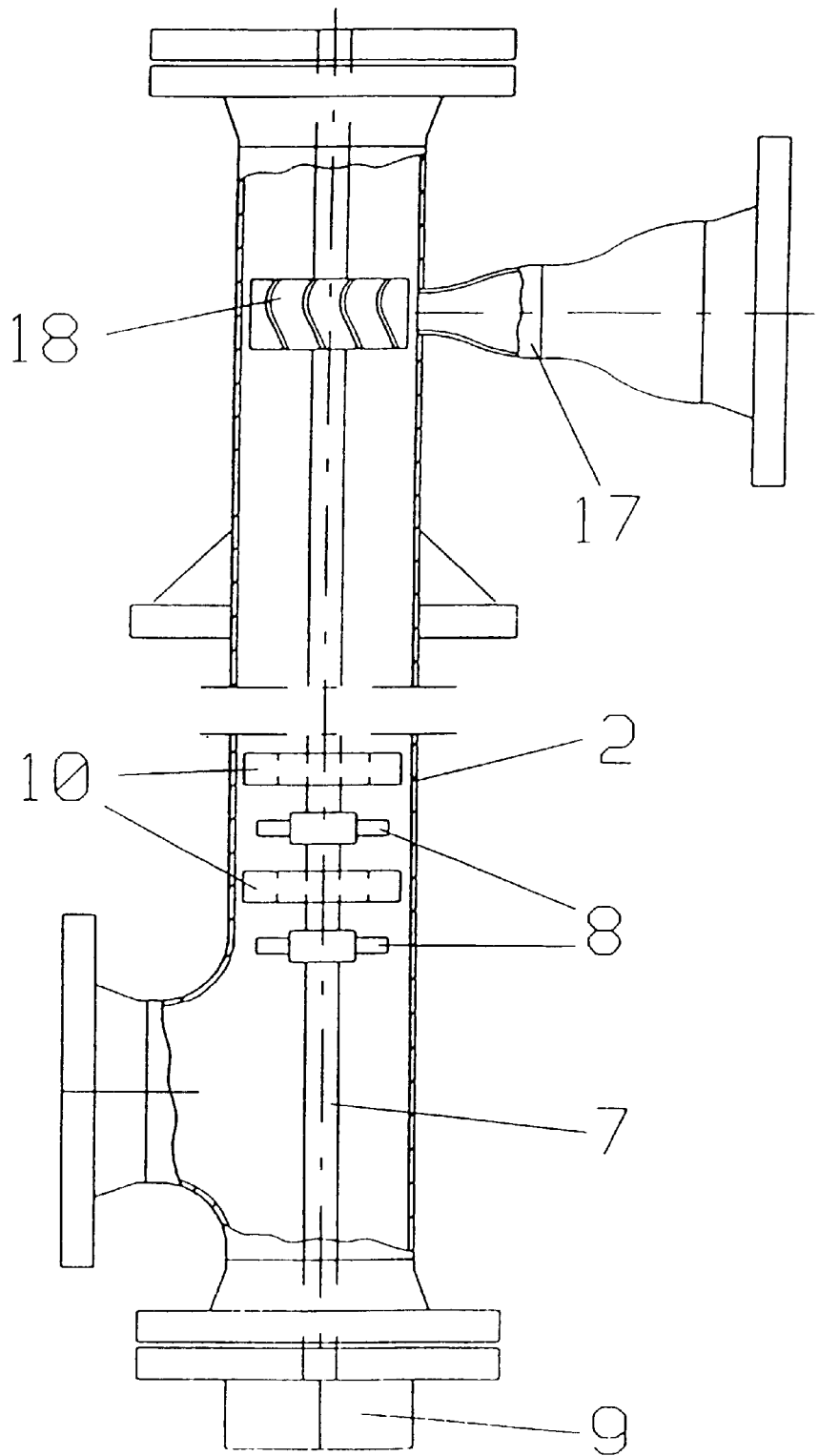
FIG. 4 is on the same scale a similar agitator, with alternative driving means.

FIG. 4 shows an alternative motor to operate the unit, where the liquid flow is ejected through a nozzle 17 to drive a turbine 18 in connection with the agitator.

Technical advantages according to the flocculation system:

The flocculation process is optimised by plug-type flow, optimal stirring and turbulence, limited shear forces that may destroy the flakes, adding chemicals at an unlimited number of places at optimal time periods.

Further, technical advantages according to the flotation plant:

The plant makes it possible to supply gas/air at an optimal amount and bubble size. By means of the diffusor- and coalescer system the flotation is rendered very effective and the surface area of the flotation chamber becomes small): high load $m^3/m^2h$.

Experiment:

An experiment was performed with sea water containing oil, the amount of water was app. 4000 l/h and the oil content in raw water app. 1000 mg/l. The average oil droplet size was 5 my and pH in the sea water was 6.2. Two chemicals A and B were added and the reaction time was respectively 45 sec. for each chemical. Approximately 0.1 l flotation gas/l of water was added, and the process pressure was 1 bar abs. Results from the experiment show that there was obtained a reduction of oil in water corresponding to a remainder of oil below 5 mg/l.

The invention as defined in the claims is not limited to the embodiments described above. Thus, the pipe loop 2 may comprise horizontally or tilted pipes instead of vertically arranged pipes. Further, the bubble generator(s) may consist of one or more gas nozzles arranged in a bubble chamber instead of static mixers. Possibly, the bubble generator may deliver mixed gas/water directly to the flotation device. The lamellas in the coalescer may be corrugated and coated e. g. with PTFE (polytetrafluoroethylene) to avoid oil sticking on the surface thereof.

I claim:

1. A method for purification of a liquid which is polluted by other liquids or solid material, which comprises adding one or more chemicals to the polluted liquid in a flocculation device, said flocculation device comprising one or more pipe loops with built-in dynamic agitator means for providing turbulence and plug-type flow through the loop, subsequent to said flocculation device purified liquid and the pollutants are separated in a flotation device.

2. The method according to claim 1, wherein the liquid is water polluted by oil.

3. An apparatus for purification of liquid which is polluted by other liquids or solid material, comprising a flocculation device, comprising a pipe loop with built-in dynamic agitator means for providing turbulence and plug-type flow through the loop to cause flocculation of the other material, and a flotation device connected to said pipe loop for separating the other material from said liquid.

4. The apparatus according to claim 2, wherein the pipe loop comprises vertical pipe elements connected to horizontal pipe sections, each pipe element having an agitator comprising a shaft driven by a driving device, wherein said shaft supports propeller elements and goes throughout the element, and the agitator further comprises stationary guiding vanes.

5. The apparatus according to claim 4, wherein one or more pipe elements is provided with connecting lines for adding one or more chemicals.

6. The apparatus according to claim 4 or 5, wherein at least one pipe element is provided with connecting lines for supply of a flotation gas.

7. The apparatus according to claim 3, 4 or 5, wherein a bubble generator is arranged between the pipe loop and the flotation device.

8. The apparatus according to claim 3, 4 or 5, wherein a bubble generator is arranged in an external pipe system where one end of the system is connected to the flotation device and the other end is connected to the pipe loop immediately before the flotation device.

9. The apparatus according to claim 7, wherein the bubble generator comprises static mixers.

10. The apparatus according to claim 7, wherein a diffusor is arranged between the flotation device and the bubble generator.

11. The apparatus according to claim 3, 4 or 5, wherein the flotation device is provided with a coalescer.

12. The apparatus according to claim 11, wherein the coalescer comprises lamellas arranged horizontally or tilted.

13. The apparatus according to claim 12, wherein the lamellas are corrugated or shaped in a manner that support formation of gas pockets at their underside.

14. The apparatus according to claim 13, wherein the lamellas are coated with a coating that is oil repellent.

15. The apparatus according to claim 14, wherein the coating is a polytetrafluoroethylene coating.

16. The apparatus according to claim 6, wherein a bubble generator is arranged between the pipe loop and the flotation device.

17. The apparatus according to claim 6, wherein a bubble generator is arranged in an external pipe system where one end of the system is connected to the flotation device and the other end is connected to the pipe loop immediately before the flotation device.

18. The apparatus according to claim 8, wherein the bubble generator comprises static mixers.

19. The apparatus according to claim 8, wherein a diffusor is arranged between the flotation device and the bubble generator.

20. The apparatus according to claim 9, wherein a diffusor is arranged between the flotation device and the bubble generator.

21. The apparatus according to claim 6, wherein the flotation device is provided with a coalescer.

22. The apparatus according to claim 7, wherein the flotation device is provided with a coalescer.

23. The apparatus according to claim 8, wherein the flotation device is provided with a coalescer.

24. The apparatus according to claim 9, wherein the flotation device is provided with a coalescer.

25. The apparatus according to claim 10, wherein the flotation device is provided with a coalescer.

\* \* \* \* \*